United States Patent [19]
Wood

[11] 4,423,761
[45] Jan. 3, 1984

[54] LOWER BEAD LOOSENER STROKE ADJUSTMENT

[75] Inventor: John F. Wood, Brentwood, Tenn.

[73] Assignee: Sun Electric Corporation, Crystal Lake, Ill.

[21] Appl. No.: 356,764

[22] Filed: Mar. 10, 1982

[51] Int. Cl.³ .............................................. B60C 25/08
[52] U.S. Cl. .................................................. 157/1.28
[58] Field of Search ..................... 157/1.24, 1.26, 1.28

[56] References Cited
U.S. PATENT DOCUMENTS
4,168,733  9/1979  Gwaltney .......................... 157/1.28

FOREIGN PATENT DOCUMENTS
622630  2/1927  France ............................... 157/1.28

Primary Examiner—James G. Smith
Attorney, Agent, or Firm—Allegretti, Newitt, Witcoff & McAndrews, Ltd.

[57] ABSTRACT

An improved means for adjustably securing a bead-loosening shoe to its drive cylinder is disclosed. The securing means includes a channel shaped tube, secured to the cylinder, and a mating connector, secured to the shoe. A pair of locking apertures in the connector are selectively aligned with a pair of adjustment apertures in the channel shaped tube to set the stop position of the shoe at the full extension point of the cylinder.

3 Claims, 4 Drawing Figures

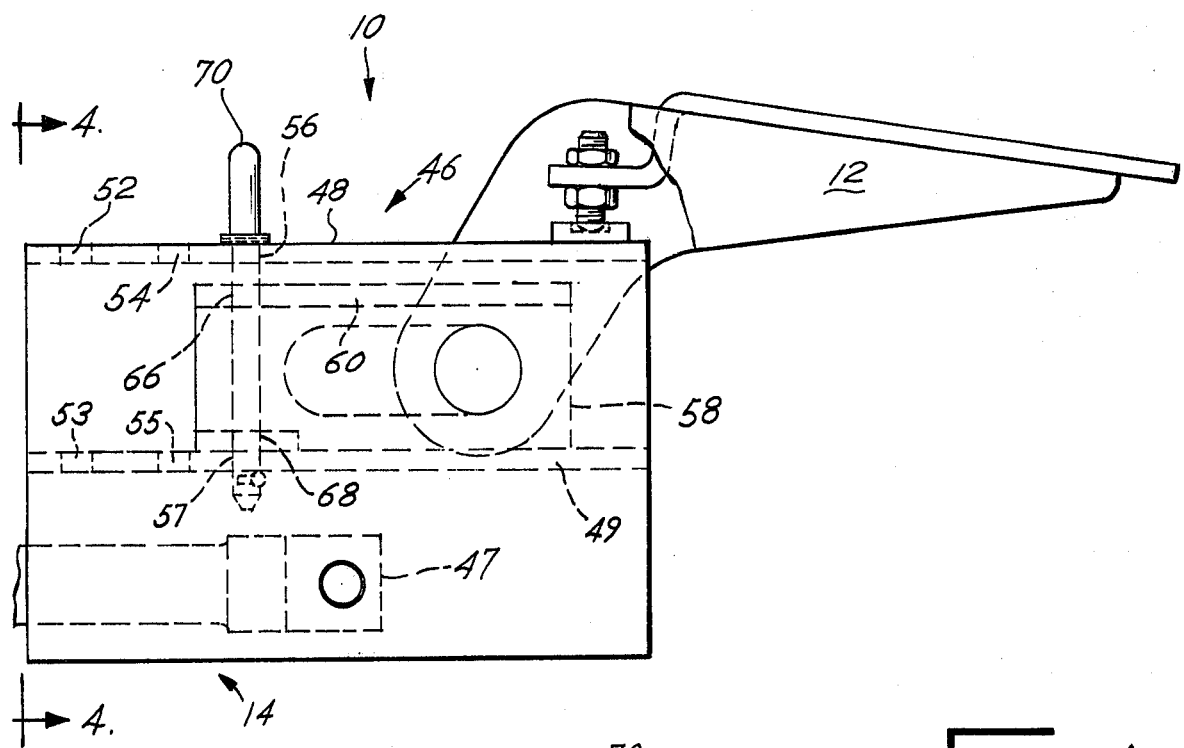
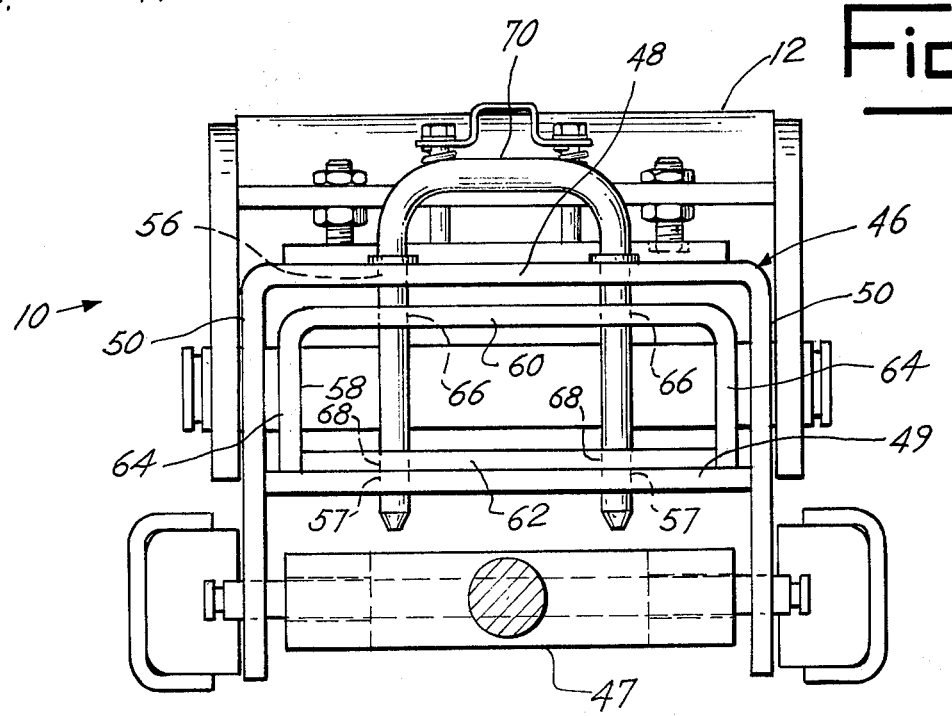

LOWER BEAD LOOSENER STROKE ADJUSTMENT

BACKGROUND OF THE INVENTION

The present invention relates generally to an automatic tire changing apparatus and more particularly to the interconnection between the lower beadloosening shoe and the corresponding drive cylinder.

As is generally well known, automatic tire changing machines are designed to quickly separate the tire of a wheel assembly from the rim thereof. The machine includes a platform and a threaded post housing a rotatable central shaft. The wheel assembly is placed over the threaded post and is secured on the platform.

The tire changer further includes upper and lower bead-loosening shoes, which are often driven by hydraulic and/or pneumatic pressure. These shoes are designed to engage the wheel assembly substantially at the junction of the tire and rim. Driven by the fluid and/or air pressure, the shoes forcibly loosen the tire bead from the rim's bead seat flange and thereby permit the desired separation (removal) of the tire from the rim.

Separation is completed by inserting a demount lever between the tire and rim, securing the demount lever to the rotatable central shaft, and rotating the shaft and demount lever about the wheel assembly. The central shaft is rotated by the same motor system operating the bead-loosening shoes.

With the variety of rim shapes and sizes, the automatic tire changing machine must include means for adjusting or modifying the distance travelled by the lower bead-loosening shoe. Otherwise substantial damage to the rim and/or the tire may occur. For example, if the shoe travels too far, it will engage the rim core and bend the rim out-of-round.

SUMMARY OF THE INVENTION

In a principal aspect, the present invention is an improved means for securing a bead-loosening shoe to its drive cylinder, such that the extent of shoe movement can be varied and adjusted. That is, the stop position of the shoe, with full extension of the drive cylinder, can be selectively set.

This improved shoe-securing means includes a channel shaped tube secured to the drive cylinder so as to move in accordance therewith. The channel shaped tube defines at least two pairs of adjustment apertures therein.

The shoe-securing means further includes a connector adapted to mate with and be slideably received within the channel shaped tube. The bead-loosening shoe is secured to the connector.

The connector defines a pair of locking apertures designed to align with a pair of the adjustment apertures. The connector is locked with respect to the channel shaped tube by a locking pin which engages the locking apertures and the selected pair of adjustment apertures.

As such, the stop position of the bead-loosening shoe is set by selection of the adjustment aperture pair. The number and spacing of the adjustment aperture pairs can be varied as each particular application requires.

It is thus an object of the present invention to provide an improved automatic tire changer. It is also an object to provide a tire changer wherein the stop position of a bead-loosening shoe is selectively adjustable. Another object is an automatic tire changing machine featuring an inexpensively and readily maintained adjustable bead-loosening shoe.

These and other features, objects and advantages are apparent in the following detailed description of the present invention.

BRIEF DESCRIPTION OF THE DRAWING

A preferred embodiment of the present invention is set forth below with reference to the drawing wherein:

FIG. 3 is a side view of a preferrred embodiment of the present invention as incorporated in the machine shown in FIG. 1; and FIG. 4 is a partial cross-sectional view taken along line 4—4 in FIG. 3.

DETAILED DESCRIPTION OF A PREFERRED EMBODIMENT

Figure 1:
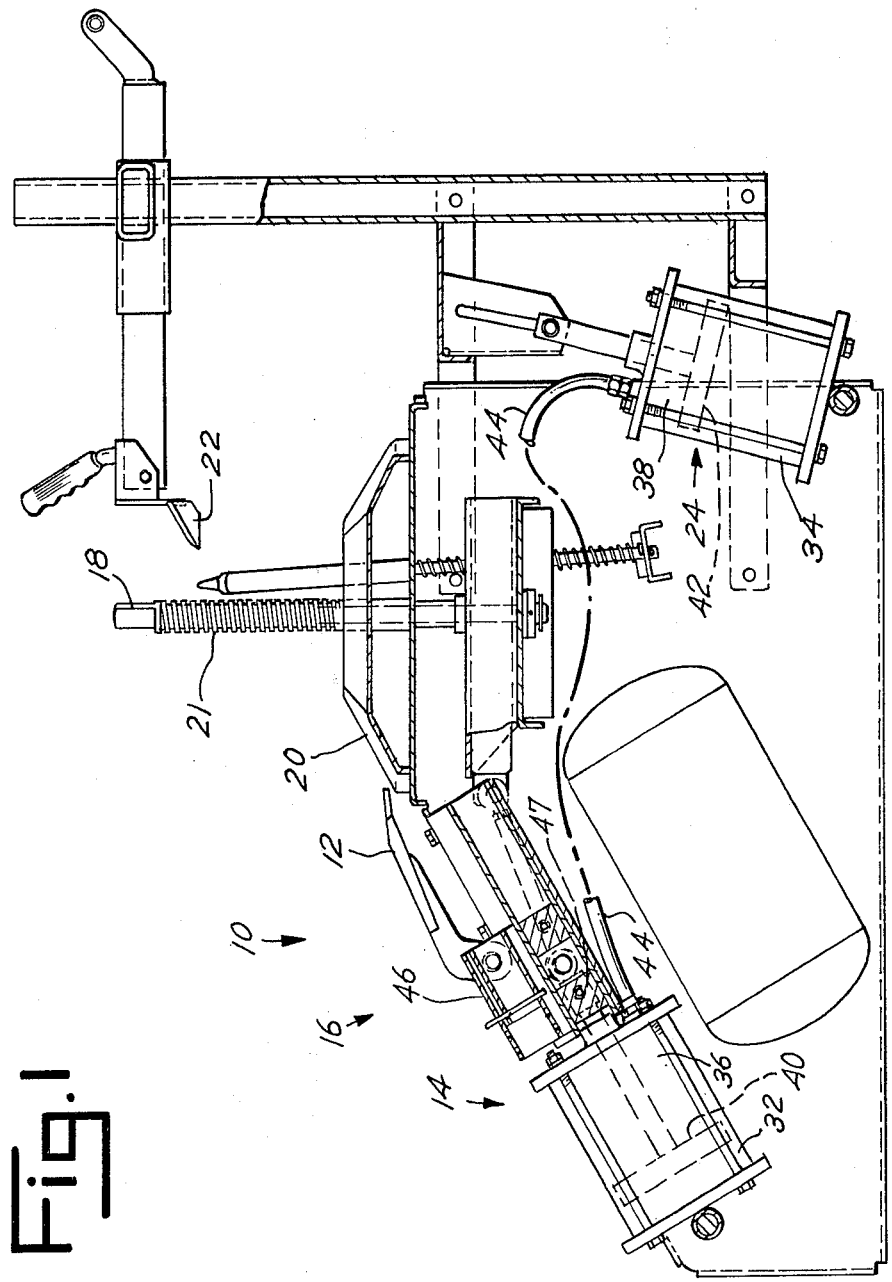
FIG. 1 is a partial cross-sectional view of an automatic tire changing machine.
Figure 2:
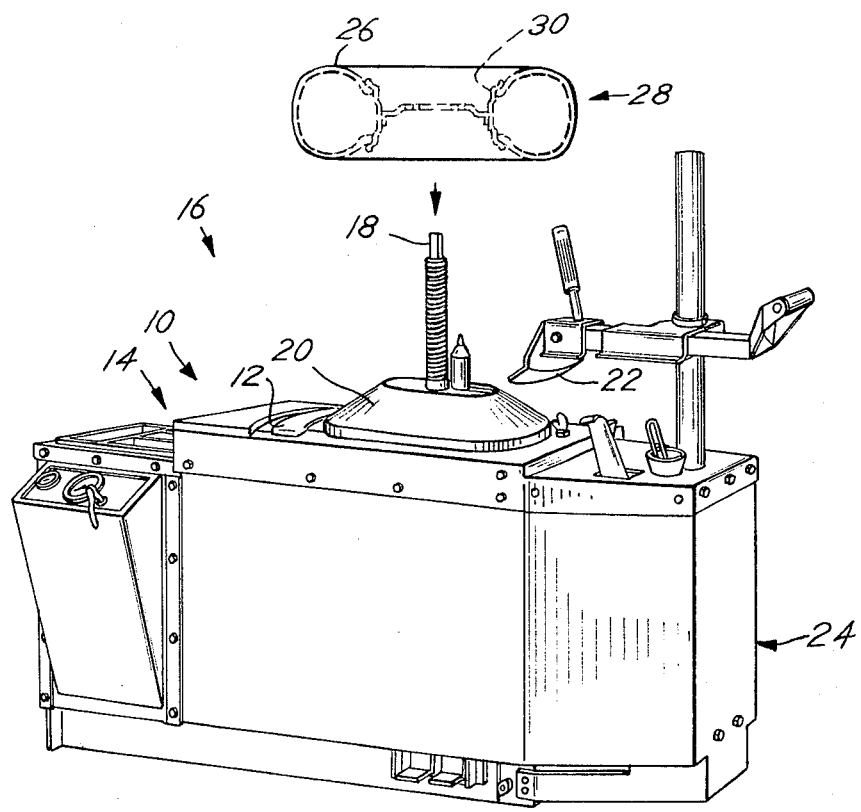
FIG. 2 is a perspective view of an automatic tire changing machine.

The present invention is shown in the drawing as an improved means, generally designated 10, for adjustably securing a lower bead-loosening shoe 12 to a drive cylinder 14. As best shown in FIG. 1, the lower bead-loosening shoe 12 and cylinder 14 are part of an automatic tire changing apparatus 16.

The tire changer 16 further includes a rotatable central shaft 18, a center post 19, a wheel-supporting platform 20, an upper bead-loosening shoe 22, and a corresponding drive cylinder 24. As is well known in the art, the tire changing apparatus 16 is designed to quickly separate a tire 26 of a wheel assembly 28 from a rim 30 thereof. A new tire (not shown) is then mounted on the rim 30 by reversal of the separation procedure.

The drive cylinders 14, 24 each include, respectively, lower ends 32, 34, upper ends 36, 38, and pistons 40, 42. A interconnect line 44 runs between the upper ends 36, 38 of both drive cylinders 14, 24. When the drive cylinder 14 is activated, pressurized air (not shown) rushes into the lower end 32. The piston 40 then rises, causing the lower bead-loosening shoe 12 to rise and the hydraulic fluid (not shown) in the upper end 36 to run out of the drive cylinder 14 and through the interconnect line 44. As a result, the piston 42 in the drive cylinder 24 is forced down, away from the upper end 38. This causes the upper bead loosening shoe 22 to lower.

More particularly, the wheel assembly 28 is placed on the platform 20 in a substantially horizontal position. The center post 19 extends through a central opening of the rim 30 and is threaded to receive a collar (not shown), which is tightened against the rim 30.

Thereafter, the drive cylinders 14, 24 are activated, causing the beadloosening shoes 12, 22 to advance towards the wheel assembly 28. The bead-loosening shoes 12, 22 engage the wheel assembly 28 in the area of the junction between the tire 26 and rim 30 and thereby loosen the tire bead. Once the bead is loosened, a demount lever (not shown) is inserted in a gap between the tire 26 and rim 30 and engaged upon the central shaft 18. The central shaft 18 and demount lever are then mechanically rotated to completely free the tire bead from the rim 30. In the preferred embodiment, the drive cylinder 14 provides the mechanical power to rotate the shaft 18. The process is repeated for the lower tire bead.

The improved shoe-securing means 10 includes a channel 46 secured to the drive cylinder 14. As best shown in FIG. 1, the drive cylinder 14 includes a power shaft 47, and the channel 46 is rigidly affixed thereto so as to move in accordance the operation of the drive cylinder 14.

In this preferred embodiment, the channel 46 is substantially U-shaped, having an upper plate portion 48 and a pair of side plate portions 50. A center plate portion 49 forms a substantially rectangular, tubular configuration. The upper plate portion 48 defines, preferably, three pairs of adjustment apertures 52, 54, 56, respectively. The center plate portion 49 possesses three corresponding and aligned pairs of adjustment apertures 58, 60, 62. Each pair defines an axis line therethrough substantially perpendicular to the line of action of the hydraulic drive cylinder 14, i.e., the line of movement of the channel 46.

The improved shoe-securing means 10 further includes a connector 64. The lower bead-loosening shoe 12 is pivotally secured to the connector 64. As shown, the connector 64 is preferably rectangular in cross-section, defining upper and lower wall portions 66, 68 and a pair of side wall portions 70.

The channel 46 is adapted to matingly receive the connector 64. The rectangular cross-section of the channel 46 and connector 64 substantially prevents the connector 64 from rotating.

The connector 64 defines a pair of locking apertures 72 adapted to substantially align with each pair of adjustment apertures 52, 54, 56, depending on the relative position of the connector 64 within channel 46. As shown, the locking apertures 72 are formed in the upper wall portion 66. Preferably, a similar and aligned pair of locking apertures 74 is formed in the lower wall portion 68 of the connector 58.

The shoe-securing means 10 finally includes a locking pin 76 adapted to lockingly engage the locking apertures 72, 74 and the selected pair of adjustment apertures 52, 54, or 56 and 58, 60, or 62, respectively, of the channel 46. In this preferred embodiment, the locking pin 76 is also substantially U-shaped.

As such, the connector 64, and thus the bead-loosening shoe 12, is secureable to the channel 46 in one of three positions. Selection thereof determines the stop position of the shoe 12 with full extension of the drive cylinder 14. Selection is made in accordance with the wheel assembly 28, i.e., the shape and size of the rim 30. Thus, contact between the shoe 12 and the rim 30 during the operation of the bead loosening shoe 12 is substantially avoided, thereby reducing the chance that the shoe 12 or rim 30 will be damaged.

The present invention provides quick and easy adjustment of the shoe stop position, without complicated or expensive hardware. Further, the stroke of the drive cylinder 14 is uninhibited and unaltered, such that full power is developed.

While a single preferred embodiment has been described, it is to be understood that changes and modifications can be made without departing from the true scope and spirit of the present invention, as defined by the following claims.

What is claimed is:

1. In a tire changing machine of the type having a bead-loosening shoe driven by a cylinder, an improved means for adjustably securing said bead-loosening shoe thereto comprising, in combination:

a channel secured to said cylinder so as to move therewith, said channel defining at least two pairs of adjustment apertures;

a connector adapted to matingly and slideably be received by said channel, said connector defining a pair of locking apertures adapted to substantially align with said pairs of adjustment apertures as said connector moves within said channel; and a locking pin adapted to engage said channel and said connector through said adjustment apertures and said locking apertures, respectively, and thereby lock said connector with respect to said channel;

said bead-loosening shoe being secured to and extending from said connector, whereby the stop position of said shoe is set by selection of said adjustment apertures.

2. An improved means as claimed in claim 1 wherein said channel is substantially rectangular tubular shaped having an upper and central plate portion, said upper and central plate portions defining said adjustment apertures.

3. An improved means as claimed in claim 2 wherein said connector is substantially rectangular having an upper and lower wall porion, said upper and lower wall portions defining said adjustment apertures.

* * * * *